United States Patent
Lu

(10) Patent No.: US 11,586,332 B2
(45) Date of Patent: Feb. 21, 2023

(54) TOUCH DISPLAY PANEL AND DRIVE METHOD FOR THE SAME, AND TOUCH DISPLAY DEVICE

(71) Applicant: Xiamen Tianma Micro-Electronics Co., Ltd., Xiamen (CN)

(72) Inventor: Feng Lu, Shanghai (CN)

(73) Assignee: XIAMEN TIANMA MICRO-ELECTRONICS CO., LTD., Xiamen (CN)

(*) Notice: Subject to any disclaimer, the term of this patent is extended or adjusted under 35 U.S.C. 154(b) by 0 days.

(21) Appl. No.: 17/377,277

(22) Filed: Jul. 15, 2021

(65) Prior Publication Data

US 2022/0206636 A1 Jun. 30, 2022

(30) Foreign Application Priority Data

Dec. 29, 2020 (CN) .......................... 202011598946.4

(51) Int. Cl.
*G06F 3/044* (2006.01)
(52) U.S. Cl.
CPC .......... *G06F 3/0446* (2019.05); *G06F 3/0445* (2019.05); *G06F 2203/04111* (2013.01)

(58) Field of Classification Search
CPC .. G06F 3/0446; G06F 3/0412; G06F 3/04184; G06F 3/0445; G06F 2203/04111; G06F 2203/04107
See application file for complete search history.

(56) References Cited

U.S. PATENT DOCUMENTS

2018/0181248 A1* 6/2018 Chang ................. G06F 3/04166

* cited by examiner

*Primary Examiner* — Deeprose Subedi
(74) *Attorney, Agent, or Firm* — Alston & Bird LLP

(57) ABSTRACT

A touch display panel, a method for driving the same and a touch display device are provided. The touch display panel includes a substrate, and a light-emitting array layer, a packaging layer, a first electrode layer and a color resistor layer successively arranged on the substrate. The first electrode layer includes multiple first touch electrodes. The packaging layer includes a first sub-packaging layer and a second sub-packaging layer which are successively arranged in a direction away from the substrate and between which an auxiliary electrode is arranged. Projection of the first touch electrode is at least partially overlapped with projection of the auxiliary electrode in a direction perpendicular to the substrate. In touch charging stage, the first touch electrode is applied with a first driving signal, the auxiliary electrode is applied with a second driving signal, and the second driving signal and the first driving signal are synchronous.

19 Claims, 15 Drawing Sheets

(12) United States Patent
US 11,586,332 B2

TOUCH DISPLAY PANEL AND DRIVE METHOD FOR THE SAME, AND TOUCH DISPLAY DEVICE

CROSS REFERENCE OF RELATED APPLICATION

The present application claims priority to Chinese Patent Application No. 202011598946.4, titled "TOUCH DISPLAY PANEL AND DRIVE METHOD FOR THE SAME, AND TOUCH DISPLAY DEVICE", filed on Dec. 29, 2020 with the China National Intellectual Property Administration, which is incorporated herein by reference in its entirety.

FIELD

The present disclosure relates to the technical field of display, and in particular to a touch display panel, a method for driving the touch display panel and a touch display device.

BACKGROUND

With the development of display technology, an organic light emitting diode (OLED) display panel has been made widely available to due to advantages such as low energy consumption, high resolution, high brightness, fast response, no backlight and low cost. However, in the OLED display panel integrated with touch electrodes, parasitic capacitance between the touch electrodes and a cathode is large, resulting in poor accuracy and sensitivity in touch detection.

SUMMARY

In view of above, a touch display panel, a method for driving a touch display panel and a touch display device are provided according to embodiments of the present disclosure to solve the problem of large parasitic capacitance between touch electrodes and a cathode.

The following technical solutions are provided according to embodiments of the present disclosure.

A touch display panel includes a substrate, and a light-emitting array layer, a packaging layer, a first electrode layer and a color resistor layer that are successively arranged on a surface of the substrate.

The first electrode layer includes multiple first touch electrodes.

The packaging layer includes at least a first sub-packaging layer and a second sub-packaging layer. The first sub-packaging layer and the second sub-packaging layer are successively arranged in a direction away from the substrate. An auxiliary electrode is arranged between the first sub-packaging layer and the second sub-packaging layer. A projection of the first touch electrode is at least partially overlapped with a projection of the auxiliary electrode in a direction perpendicular to the substrate.

In a charging stage of the first touch electrodes, the first touch electrode is applied with a first driving signal, the auxiliary electrode is applied with a second driving signal, and the second driving signal and the first driving signal are synchronous.

Embodiments of the present disclosure further provide a touch display device includes the above touch display panel.

Embodiments of the present disclosure further provide a method for driving a touch display panel. The method is applied to the above touch display panel and includes:

inputting a first driving signal to a first touch electrode and inputting a second driving signal to an auxiliary electrode in a charging stage of the first touch electrodes, where the second driving signal and the first driving signal are synchronous.

According to the touch display panel, the method for driving the touch display panel and the touch display device in the present disclosure, the packaging layer includes at least the first sub-packaging layer and the second sub-packaging layer, and the first sub-packaging layer and the second sub-packaging layer are successively arranged in the direction away from the substrate. Since an auxiliary electrode is arranged between the first sub-packaging layer and the second sub-packaging layer, the projection of the first touch electrode is at least partially overlapped with the projection of the auxiliary electrode in the direction perpendicular to the substrate, the parasitic capacitor affecting the first touch electrode is mainly generated between the first touch electrode and the auxiliary electrode.

In the charging stage of the first touch electrodes, the first touch electrode has the first driving signal, the auxiliary electrode has the second driving signal, and the second driving signal and the first driving signal are synchronous, so that the parasitic capacitance between the first touch electrode and the auxiliary electrode is smaller, thereby effectively reducing the influence of the parasitic capacitor on the first touch electrodes, thus improving sensitivity of the touch detection.

BRIEF DESCRIPTION OF THE DRAWINGS

In order to illustrate the technical solutions in the embodiments of the present disclosure or in the conventional technology in details, drawings used in the description of the embodiments or the conventional technology will be described simply in the following. It is apparent that the drawings in the following description only show some embodiments of the disclosure. For those skilled in the art, other drawings can also be obtained according to the drawings without any creative work.

DETAILED DESCRIPTION

Hereinafter, the technical solutions in the embodiments of the present disclosure are described in conjunction with the drawings in the embodiments of the present disclosure to make the foregoing objectives, features and advantages of the present disclosure more easy to understand. It is apparent that the described embodiments are only some rather than all embodiments of the present disclosure. All other embodiments obtained by those skilled in the art based on the embodiments of the present disclosure without any creative work fall within the protection scope of the present disclosure.

Figure 1:
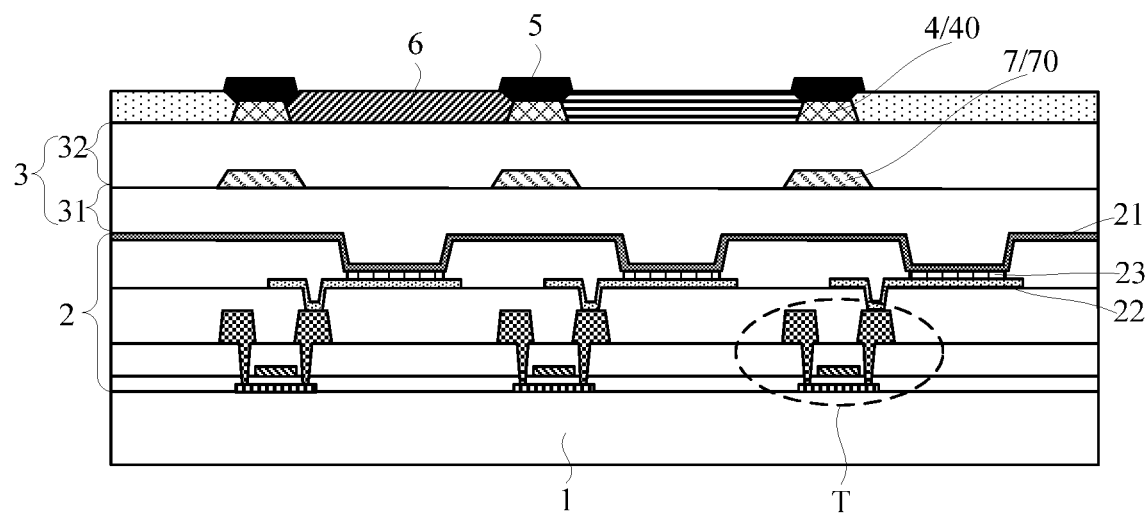
FIG. 1 is a schematic section view of a touch display panel according to an embodiment of the present disclosure.

A touch display panel is provided according to an embodiment of the present disclosure. FIG. 1 is a schematic section view of a touch display panel according to an embodiment of the present disclosure. The touch display panel includes a substrate 1, and a light-emitting array layer 2, a packaging layer 3, a first electrode layer and a color resistor that are successively arranged on a surface of the substrate 1. The touch display panel may further include a cover plate arranged on a surface of the color resistor layer.

In some embodiments of the present disclosure, the light-emitting array layer 2 includes multiple light-emitting units arranged in an array on the substrate 1. FIG. 1 is illustrated by taking only three adjacent light-emitting units as an example. Each light-emitting unit includes a driving circuit and a light-emitting device. The driving circuit includes at least a driving transistor T. The light-emitting device includes a cathode 21, an anode 22 and a light-emitting layer 23 between the cathode 21 and the anode 22. A source of the driving transistor T is connected with a data line of the touch display panel. A gate of the driving transistor T is connected with a scan line of the touch display panel. A drain of the driving transistor T is connected with the anode 22. After a scan signal of the scan line controls the driving transistor T to be turned on, a data signal of the data line is transmitted to the corresponding anode 22 to drive the light-emitting device to emit light.

Figure 2:
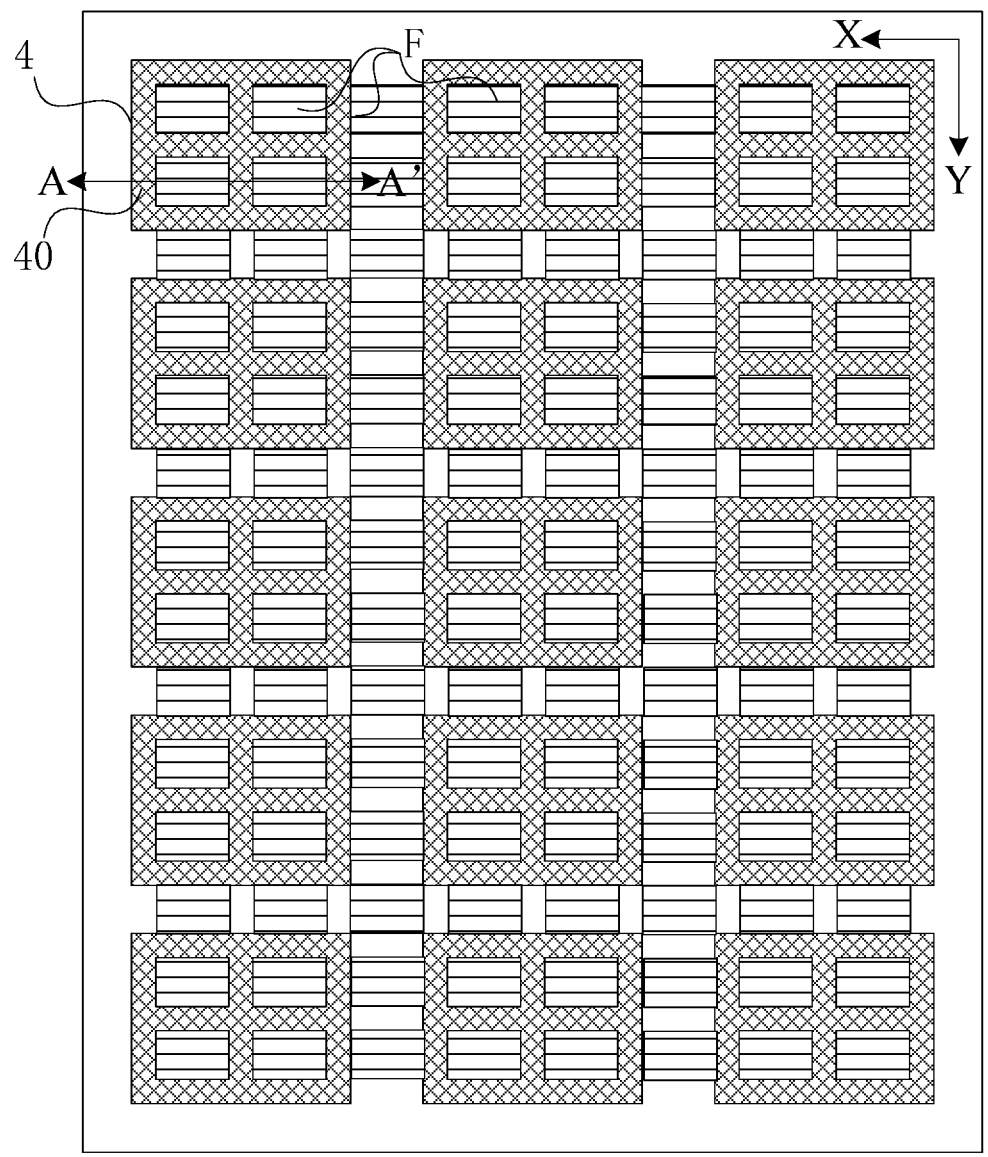
FIG. 2 is a schematic top view of multiple first touch electrodes according to an embodiment of the present disclosure.

In an embodiment of the present disclosure, the first electrode layer includes multiple first touch electrodes 4. In some embodiments of the present disclosure, as shown in FIG. 2 which is a schematic top view of multiple first touch electrodes according to an embodiment, the first touch electrode 4 is a metal mesh-shaped electrode formed by multiple metal wires 40. A section structure of the first touch electrode 4 in FIG. 1 is the section structure by cutting the first touch electrode 4 along a cutting line AA' in FIG. 2.

Figure 3:
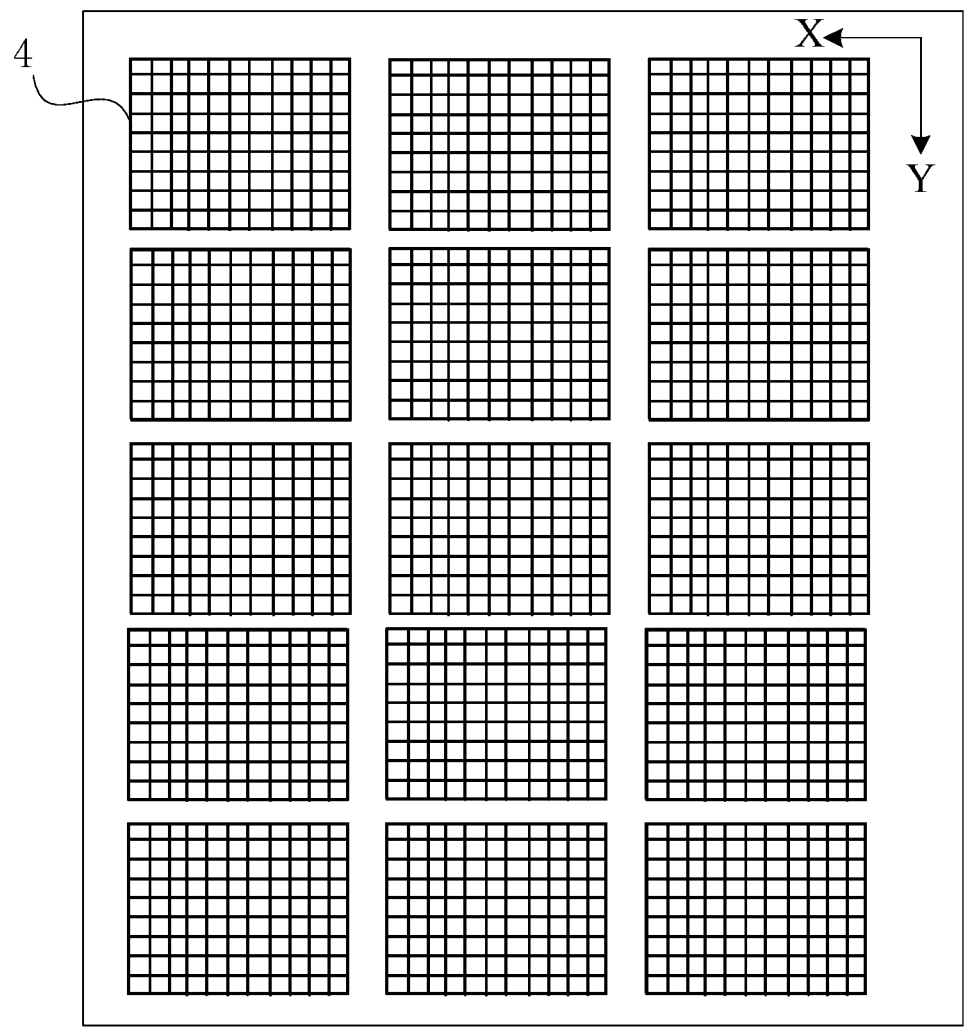
FIG. 3 is a schematic top view of multiple first touch electrodes according to another embodiment of the present disclosure.

It should be noted that, a mesh of the metal mesh covers at least one light-emitting unit F in a direction perpendicular to the substrate 1. FIG. 2 is illuminated by taking a case, in which one mesh of the metal mesh covers one light-emitting unit F and one first touch electrode 4 covers four light-emitting units F, as an example. However, the present disclosure is not so limited. In actual practices, an area of the light-emitting unit F is small and an area of the first touch electrode 4 is large, therefore, as shown in FIG. 3 which is a schematic top view of multiple first touch electrodes 4 according to another embodiment of the present disclosure, in which the number of the light-emitting units F covered by the first touch electrode 4 is much greater than those shown in FIG. 2.

As shown in FIG. 2, the multiple first touch electrodes 4 are arranged in an array, that is, the multiple first touch electrodes 4 achieve touch detection in a self-capacitance way. However, the present disclosure is not so limited. In other embodiments, the touch display panel may further include multiple second touch electrodes, and the first touch electrodes and the second touch electrodes achieve touch detection in a mutual capacitance way.

In an embodiment, the packaging layer 3 includes at least a first sub-packaging layer 31 and a second sub-packaging layer 32. The first sub-packaging layer 31 and the second sub-packaging layer 32 are successively arranged in a direction away from the substrate 1. In addition, an auxiliary electrode 7 is arranged between the first sub-packaging layer 31 and the second sub-packaging layer 32.

The embodiment of the present disclosure is illustrated only by taking a case, in which the packaging layer 3 includes the first sub-packaging layer 31 and the second sub-packaging layer 32, as an example. The present disclosure is not so limited. In other embodiments, the packaging layer 3 further includes a third sub-packaging layer, a fourth sub-packaging layer, and the like.

Figure 4:
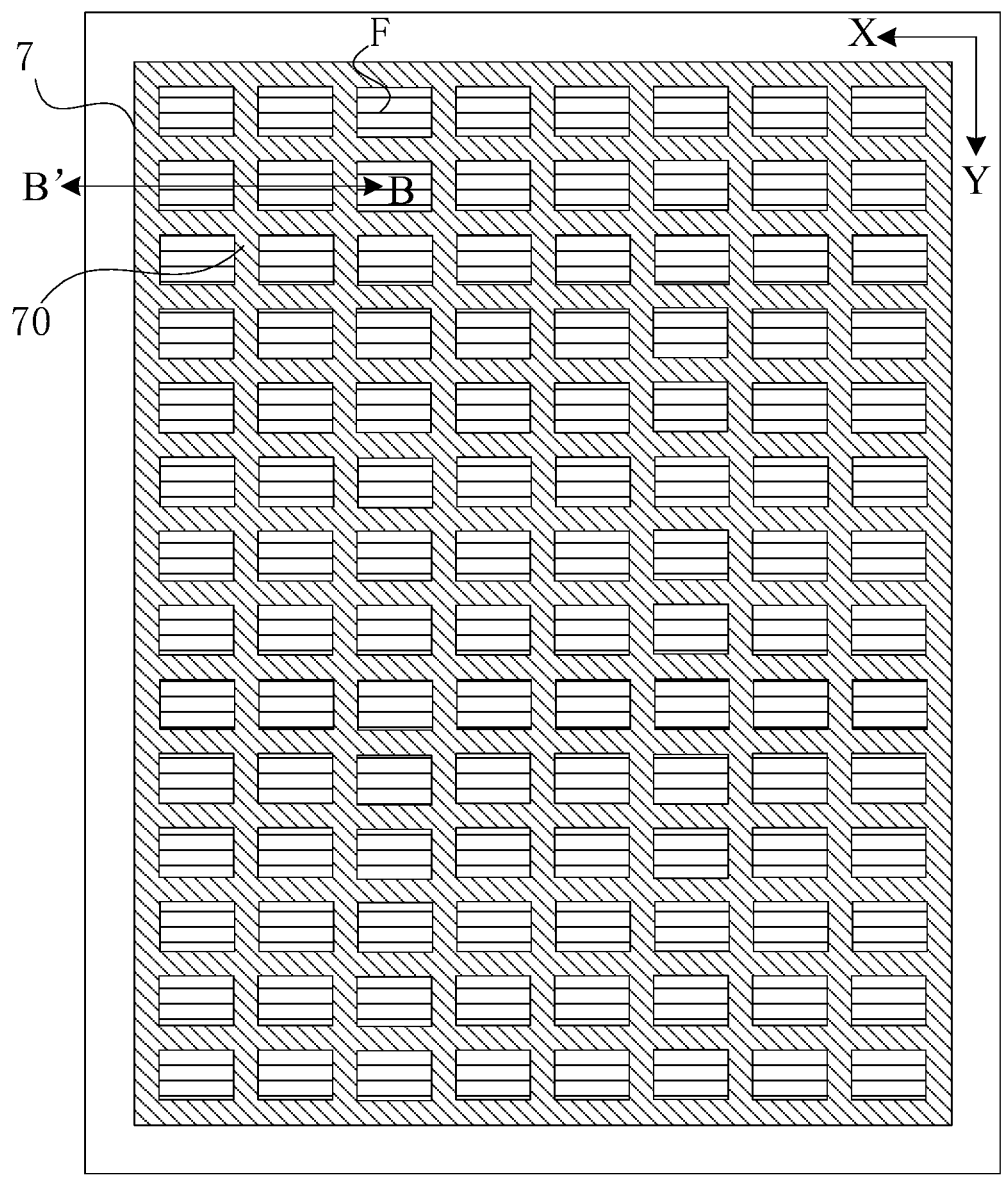
FIG. 4 is a schematic top view of auxiliary electrodes according to an embodiment of the present disclosure.

FIG. 4 is a schematic top view of auxiliary electrodes 7, according to an embodiment of the present disclosure, shown as being a metal mesh-shaped electrode formed by multiple metal wires 70. A section structure of the auxiliary electrode 7 in FIG. 1 is the section structure formed by cutting the auxiliary electrode 7 along a cutting line BB' in FIG. 4.

It should be noted that, the embodiment of the present disclosure is illuminated by taking a case that the auxiliary electrode 7 covers the entire electrode of the entire touch display panel as an example, however the application is not limited to thereto. The auxiliary electrode 7 may further be multiple auxiliary electrodes arranged in an array.

In an embodiment, a projection of the first touch electrode 4 is at least partially overlapped with a projection of the auxiliary electrode 7 in a direction perpendicular to the substrate 1. Therefore, parasitic capacitor affecting touch performance of the first touch electrode 4 is mainly generated between the first touch electrode 4 and the auxiliary electrode 7.

Moreover, in a charging stage of the first touch electrodes, the first touch electrode 4 has a first driving signal, the auxiliary electrode 7 has a second driving signal, and the second driving signal and the first driving signal are synchronous. Therefore, a parasitic capacitance between the first touch electrode 4 and the auxiliary electrode 7 is small, so that the influence of the parasitic capacitor on the touch performance of the first touch electrode 4 can be effectively reduced, thereby improving sensitivity of the touch detection.

In a case that self-capacitance touch detection on the first touch electrode 4 is performed, then in the charging stage of the first touch electrodes, the first touch electrode 4 is applied with the first driving signal, which is used to charge the first touch electrode 4, and the auxiliary electrode 7 is applied with the second driving signal, which is used to charge the auxiliary electrode 7. Since the second driving signal and the first driving signal are synchronous, charging of the auxiliary electrode 7 is completed when charging of the first touch electrode 4 is completed and the first touch electrode 4 enters a detection stage. The first touch electrode 4 has a first potential, and the auxiliary electrode 7 has a second potential. A difference between the second potential and the first potential can be reduced by setting the second driving signal, so that the parasitic capacitance between the first touch electrode 4 and the auxiliary electrode 7 can be reduced.

In some embodiments of the present disclosure, the first driving signal and the second driving signal are synchronous signals with a same frequency and a same phase, so that the first touch electrode 4 has a same signal fluctuation as the auxiliary electrode 7, and the parasitic capacitance between the first touch electrode 4 and the auxiliary electrode 7 is small at each time instant.

Based on this, in some embodiments of the present disclosure, the first driving signal and the second driving signal are synchronous signals with a same amplitude, so that the first potential of the first touch electrode 4 is equal to the second potential of the auxiliary electrode 7 after the charging is completed, and no parasitic capacitor is between the first touch electrode 4 and the auxiliary electrode 7, or the parasitic capacitor between the first touch electrode 4 and the auxiliary electrode 7 is small enough to be ignored, thereby improving sensitivity of the touch detection.

In a case that a finger touches the touch display panel, a touch capacitance between the finger and the first touch electrode 4 is $C_{finger}$ and the parasitic capacitance between the first touch electrode 4 and the auxiliary electrode 7 is $C_0$. A capacitance disturbance $\Delta$ caused by the finger touch may be expressed as:

$$\Delta = \frac{C_0 + C_{finger}}{C_0}$$

Since a smaller $C_0$ leads to a greater capacitance disturbance $\Delta$, the sensitivity of the touch detection of the touch display panel is higher. Therefore, in an embodiment of the present disclosure, the first touch electrode 4 and the auxiliary electrode 7 are applied with synchronous signals, so that the parasitic capacitance $C_0$ is smaller, and the capacitance disturbance $\Delta$ is greater, and the sensitivity of the touch detection of the touch display panel is higher.

It should be noted that, in some embodiments of the present disclosure, the projection of the first touch electrode 4 is overlapped with the projection of the auxiliary electrode 7 in the direction perpendicular to the substrate 1, that is, the projection of the auxiliary electrode 7 covers the projection of the first touch electrode 4. Therefore, the parasitic capacitor affecting touch performance of the first touch electrode 4 is only generated between the first touch electrode 4 and the auxiliary electrode 7. By setting the second driving signal, the second driving signal and the first driving signal are synchronous signals with a same frequency, a same amplitude and a same phase, so that the influence of parasitic capacitor on the touch performance of the first touch electrode 4 can be greatly reduced, thereby greatly improving the sensitivity of the touch detection.

In some embodiments of the present disclosure, the projection of the first touch electrode 4 may be partially overlapped with the projection of the auxiliary electrode 7 in the direction perpendicular to the substrate 1. It is illustrated by taking a case, in which the first touch electrode 4 is divided into a first part and a second part, the first part is an area whose projection is overlapped with the projection of the auxiliary electrode 7, and the second part is an area whose projection is not overlapped with the projection of the auxiliary electrode 7, as an example. The parasitic capacitor between the first part and the auxiliary electrode 7 is a first parasitic capacitor, and the parasitic capacitor between the second part and the cathode 21 is a second parasitic capacitor. The parasitic capacitor affecting touch performance of the first touch electrode 4 is a sum of the first parasitic capacitor and the second parasitic capacitor.

In a case that no auxiliary electrode 7 is arranged between the first touch electrode 4 and the cathode 21, the parasitic capacitor between the first touch electrode 4 and the cathode 21 is a third parasitic capacitor. The third parasitic capacitor may have twice the capacitance of the second parasitic capacitor. Since the auxiliary electrode 7 is arranged between the first touch electrode 4 and the cathode 21, and the second driving signal applied to the auxiliary electrode 7 and the first driving signal applied to the first touch electrode 4 are synchronous, the first parasitic capacitor is less than the second parasitic capacitor, that is, the sum of the first parasitic capacitor and the second parasitic capacitor is less than the third parasitic capacitor. Therefore, even if the projection of the first touch electrode 4 is partially overlapped with the projection of the auxiliary electrode 7, the influence of the parasitic capacitor on the touch performance of the first touch electrode 4 can be reduced.

Based on any one of the above embodiments, in some embodiments of the present disclosure, the touch display panel further includes a driving circuit. The driving circuit is electrically connected with the first touch electrode 4 and the auxiliary electrode 7. The driving circuit is configured to, in the charging stage of the first touch electrodes, output the first driving signal to the first touch electrode 4, and output the second driving signal to the auxiliary electrode 7.

In some embodiments, the first driving signal and the second driving signal are synchronous signals with the same frequency, same amplitude and same phase. For example, the first driving signal may be the same signal as the second driving signal, the first touch electrode 4 may be electrically connected with the auxiliary electrode 7, and the driving circuit may be electrically connected with the first touch electrode 4. Therefore, the driving circuit outputs a driving signal to the first touch electrode 4, to apply the first driving signal to the first touch electrode 4 and apply the second driving signal on the auxiliary electrode 7.

In some embodiments of the present disclosure, as shown in FIG. 1, the color resistor layer includes a first black matrix 5 and a color resistor 6. The first black matrix 5 is provided with multiple opening areas, and multiple color resistors 6 are respectively arranged in the multiple opening areas, that is, each of the opening areas is provided with one color resistor 6. The projection of each of color resistors 6 in the direction perpendicular to the substrate 1 is overlapped with the projection of one light-emitting unit in the direction perpendicular to the substrate 1. In addition, the color resistors 6 has the same color as light emitted by the light-emitting unit, the projection of which is overlapped with the color resistors 6. For example, the light emitted by different light-emitting units is respectively red, green and blue, and color of different color resistors 6 is also red, green and blue.

It should be noted that, in some embodiments of the present disclosure, the first touch electrode 4 and the auxiliary electrode 7 each is a metal electrode, therefore as shown in FIGS. 2 and 4, the metal wires of the first touch electrode 4 and the metal wires of the auxiliary electrode 7 are arranged in gaps between the light-emitting units F, to prevent reflection of the metal electrode from affecting display effect. In addition, the projection of the first black matrix 5 covers the projection of the first touch electrode 4 and the projection of the auxiliary electrode 7 in the direction perpendicular to the substrate 1.

In some embodiments of the present disclosure, the first black matrix 5 contacts and covers the first touch electrode 4 to better shield the first touch electrode 4 and thus have a better light shielding effect. As shown in FIG. 1, the first black matrix 5 completely covers the first touch electrode 4. In addition, the projection of the first black matrix 5 covers the projection of the auxiliary electrode 7 in the direction perpendicular to the substrate 1. Certainly, the present disclosure is not limited to thereto. In other embodiments, an insulating layer or a planarization layer may be arranged between the first black matrix 5 and the first touch electrode 4, that is, in some embodiments, the projection of the first black matrix 5 may cover the projection of the first touch electrode 4 and the projection of the auxiliary electrode 7.

It should be noted that, in the embodiment of the present disclosure, the arrangement of the auxiliary electrode 7 can reduce the parasitic capacitor affecting the first touch electrode 4. Therefore, it is not required to increase a thickness of the packaging layer 3 to reduce the parasitic capacitor affecting the first touch electrode 4. That is, in an embodiment of the present disclosure, the thickness of the packaging layer 3 may be reduced to cause the first black matrix 5 closer to the light-emitting layer 23, therefore the light-emitting layer 23 is closer to the opening area of the first black matrix 5, much large angle light emitted by the light-emitting layer 23 can be emitted from the first black matrix 5, to cause the first black matrix 5 to have a greater light shielding range without affecting the viewing angle, and light-emitting rate of the light-emitting device is improved. That is, in the embodiment of the present disclosure, the arrangement of the auxiliary electrode 7 can not only improve the touch sensitivity of the touch display panel, but also improve the display effect of the touch display panel.

In some embodiments of the present disclosure, in order to cause the first black matrix 5 to have a greater light shielding range without affecting the viewing angle, the first sub-packaging layer 31 has a thickness of 4 µm-6 µm in the direction perpendicular to the substrate 1, the second sub-packaging layer 32 has a thickness of 4 µm-8 µm in the direction perpendicular to the substrate 1, and the packaging layer 3 has a total thickness less than or equal to 12 µm in the direction perpendicular to the substrate 1.

Figure 5:
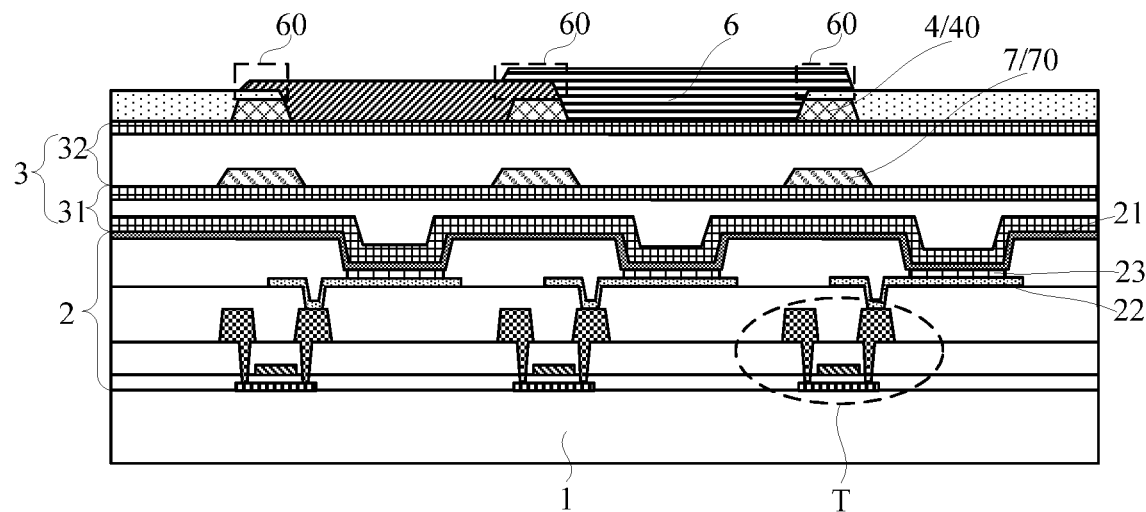
FIG. 5 is a schematic section view of a touch display panel according to another embodiment of the present disclosure.

In other embodiments of the present disclosure, as shown in FIG. 5, which is a schematic section view of a touch display panel according to another embodiment of the present disclosure, the color resistor layer may only include multiple color resistors 6 of different colors, and not include the first black matrix, so as to reduce process steps, save materials and cost.

Two adjacent color resistors 6 of different colors have an overlapping part 60. The overlapping part 60 serves as the first black matrix, that is, the projection of the overlapping part 60 covers the projection of the first touch electrode 4 and the projection of the auxiliary electrode 7 in the direction perpendicular to the substrate 1. In some embodiments of the present disclosure, as shown in FIG. 5, the overlapping part 60 completely covers the first touch electrode 4. In addition, the projection of the overlapping part 60 covers the projection of the auxiliary electrode 7 in the direction perpendicular to the substrate 1.

Figure 6:
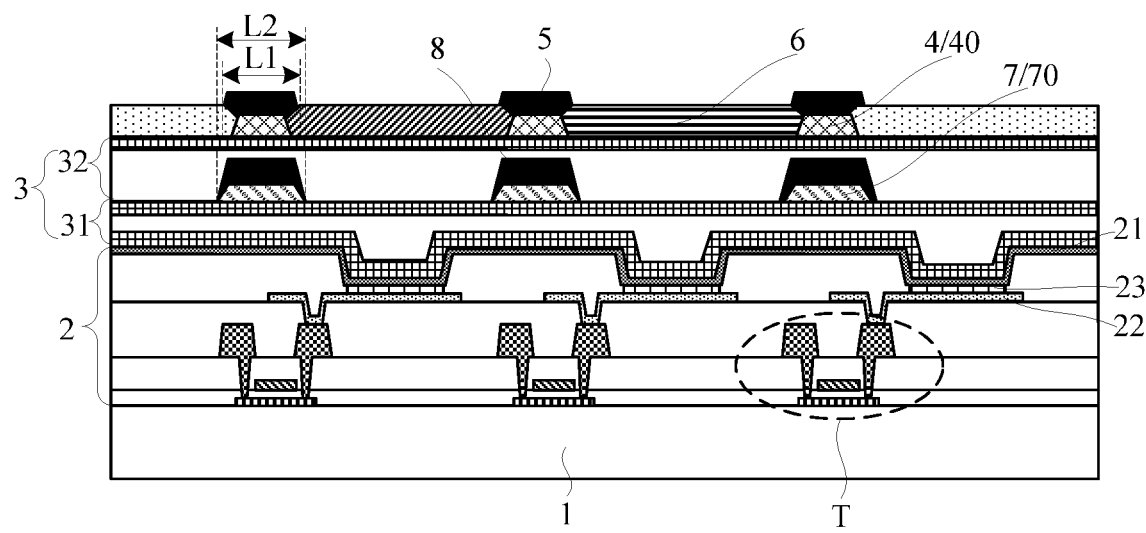
FIG. 6 is a schematic section view of a touch display panel according to another embodiment of the present disclosure.
Figure 7:
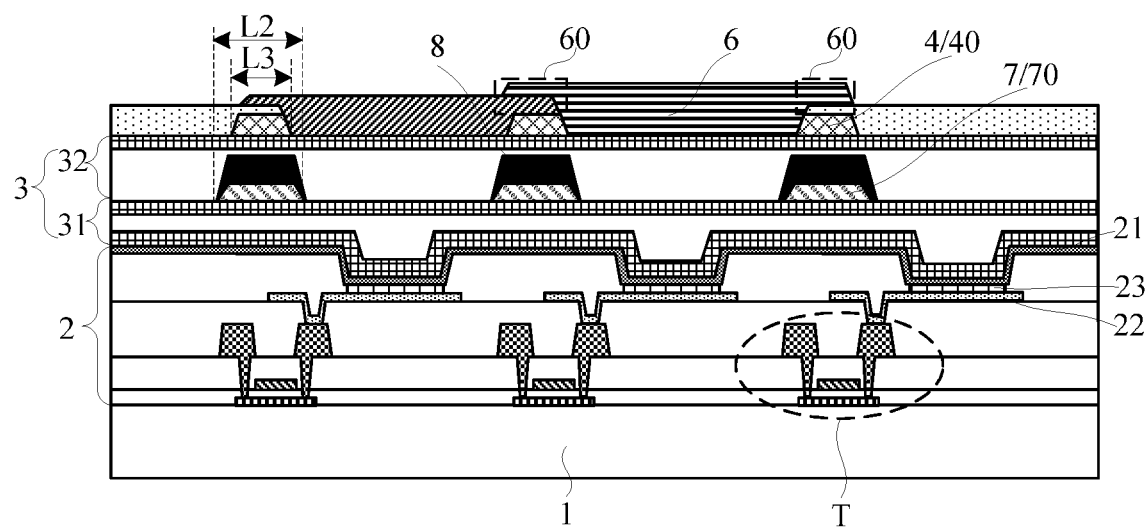
FIG. 7 is a schematic section view of a touch display panel according to another embodiment of the present disclosure.

Based on any one of the above embodiments, in some embodiments of the present disclosure, the touch display panel further includes a second black matrix 8 to better shield the auxiliary electrode 7 and have a better light shielding effect, as shown in FIG. 6 and FIG. 7. FIG. 6 is a schematic section view of a touch display panel according to another embodiment of the present disclosure. FIG. 7 is a schematic section view of a touch display panel according to another embodiment of the present disclosure. The second black matrix 8 is arranged between the auxiliary electrode 7 and the second sub-packaging layer 32. In addition, the second black matrix 8 contacts and covers the auxiliary electrode 7.

Figure 8:
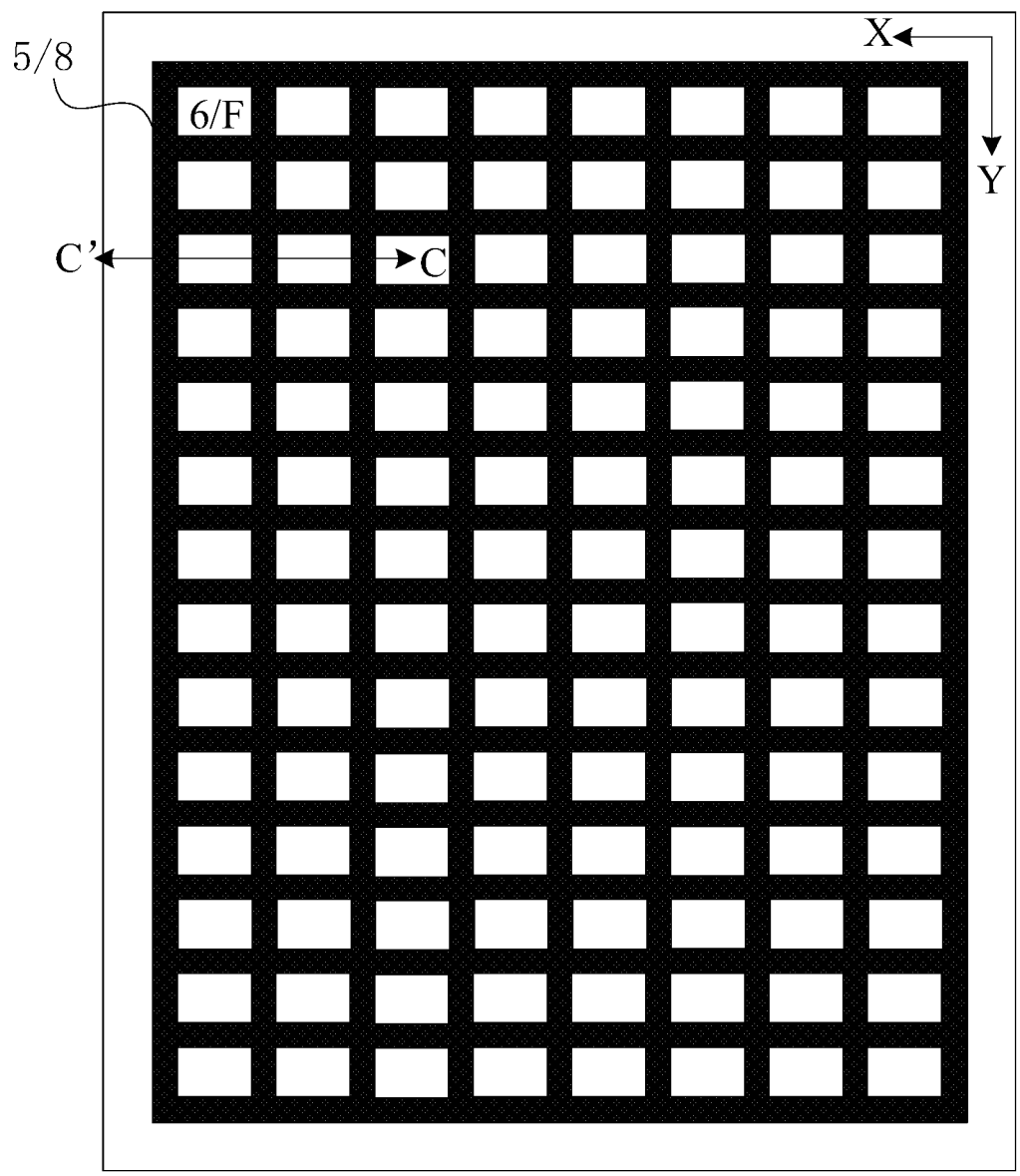
FIG. 8 is a schematic top view of a first black matrix and a second black matrix according to an embodiment of the present disclosure.

In some embodiments of the present disclosure, as shown in FIG. 8, which is a schematic top view of a first black matrix 5 and a second black matrix 8 according to an embodiment of the present disclosure, the first black matrix 5 and the second black matrix 8 have a mesh-shaped structure formed by multiple light shielding strips. A mesh area, that is, an opening area of the black matrix is an area where the color resistor 6 is arranged. The projection of the mesh area, that is, the opening area of the black matrix is overlapped with the projection of the light-emitting unit F in the direction perpendicular to the substrate 1. The section structure of the first black matrix 5 and the second black matrix 8 in FIG. 6 is the section structure formed by cutting the first black matrix 5 and the second black matrix 8 along a cutting line CC' in FIG. 8.

In some embodiments, as shown in FIG. 6, the projection of the second black matrix 8 covers the projection of the first black matrix 5 in the direction perpendicular to the substrate 1. In addition, a line width L2 of the second black matrix 8 is greater than a line width L1 of the first black matrix 5. Compared with the first black matrix 5, the second black matrix 8 is closer to the light-emitting device. Therefore, without affecting the viewing angle, the line width of the second black matrix 8 is greater, to cause greater areas of a metal electrode and a metal routing line such as a gate line and a data line shielded by the second black matrix 8, and have a better light shielding effect.

In some embodiments of the present disclosure, as shown in FIG. 7, the projection of the overlapping part 60 covers the projection of the first black matrix 5 in the direction perpendicular to the substrate 1. In addition, the line width L2 of the second black matrix 8 is greater than a line width L3 of the overlapping part 60. Based on this, the overlapping part 60 serve as the first black matrix 5 to shield the first touch electrode 4, the second black matrix 8 serves as the first black matrix 5 to shield the metal routing line such as the gate line and the data line, to reduce the first black matrix 5, thereby reducing process steps and materials. In addition, the second black matrix 8 is closer to the light-emitting device, so that the second black matrix 8 has a greater light shielding range, and the touch display panel has a better light-emitting rate and viewing angle.

Figure 9:
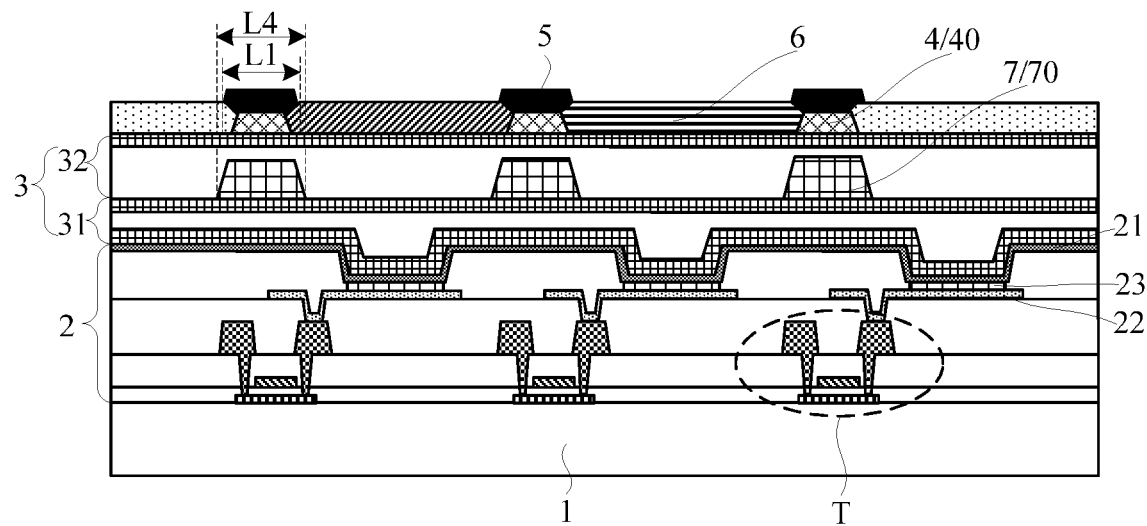
FIG. 9 is a schematic section view of a touch display panel according to another embodiment of the present disclosure.

In other embodiments of the present disclosure, as shown in FIG. 9, which is a schematic section view of a touch display panel according to another embodiment of the present disclosure. The auxiliary electrode 7 is made of a conductive light-shielding material, for example, the auxiliary electrode 7 may be made of black conductive material. Based on this, the auxiliary electrode 7 can not only form a parasitic capacitor with the first touch electrode 4, but also serves as the second black matrix 8 to achieve a light shield effect, so that the process of making the second black matrix 8 can be reduced, thereby saving materials and reducing cost. In addition, for a fingerprint identification panel with a light sensor on a side of the substrate 1 away from the light-emitting array layer 2, the auxiliary electrode 7 made of conductive light-shielding material can further prevent light reflected by the first touch electrode 4 from affecting the light sensor.

Therefore, in some embodiments of the present disclosure, the first black matrix 5 and the auxiliary electrode 7 each has a mesh-shaped structure. The mesh-shaped structure of the first black matrix 5 is shown in FIG. 8. The mesh-shaped structure of the auxiliary electrode 7 is shown in FIG. 4. In addition, a line width L4 of the auxiliary electrode 7 is greater than the line width L1 of the first black matrix 5, to improve a light shielding effect of the auxiliary electrode 7.

Figure 10:
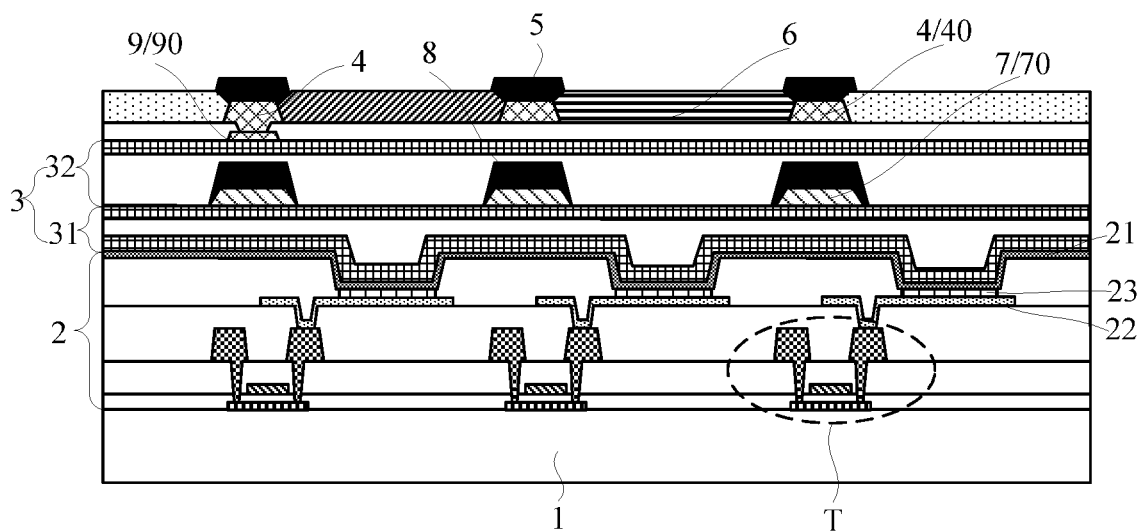
FIG. 10 is a schematic section view of a touch display panel according to another embodiment of the present disclosure.

In some embodiments of the present disclosure, as shown in FIG. 2, the multiple first touch electrodes 4 are arranged in an array. Based on this, as shown in FIG. 10, which is a schematic section view of a touch display panel according to another embodiment of the present disclosure, the touch display panel further includes a second electrode layer 9. The second electrode layer 9 includes multiple touch wires 90. The multiple touch wires 90 are respectively electrically connected with the multiple first touch electrodes 4, to achieve an electrical connection between the first touch electrode 4 and the driving circuit. In addition, an insulating layer is arranged between the second electrode layer 9 and the first electrode layer, that is, an insulating layer is arranged between the touch wire 90 and the first touch electrode 4, and the touch wire 90 is electrically connected with the first touch electrode 4 via a via-hole through the insulating layer.

In some embodiments of the present disclosure, as shown in FIG. 10, the second electrode layer 9 is arranged between the packaging layer 3 and the first electrode layer, that is, the second electrode layer 9 is arranged between the packaging layer 3 and the first touch electrode 4. In an embodiment, the insulating layer between the second electrode layer 9 and the first electrode layer is made of the same material as the packaging layer without an additional insulating material, to simplify process steps.

Figure 11:
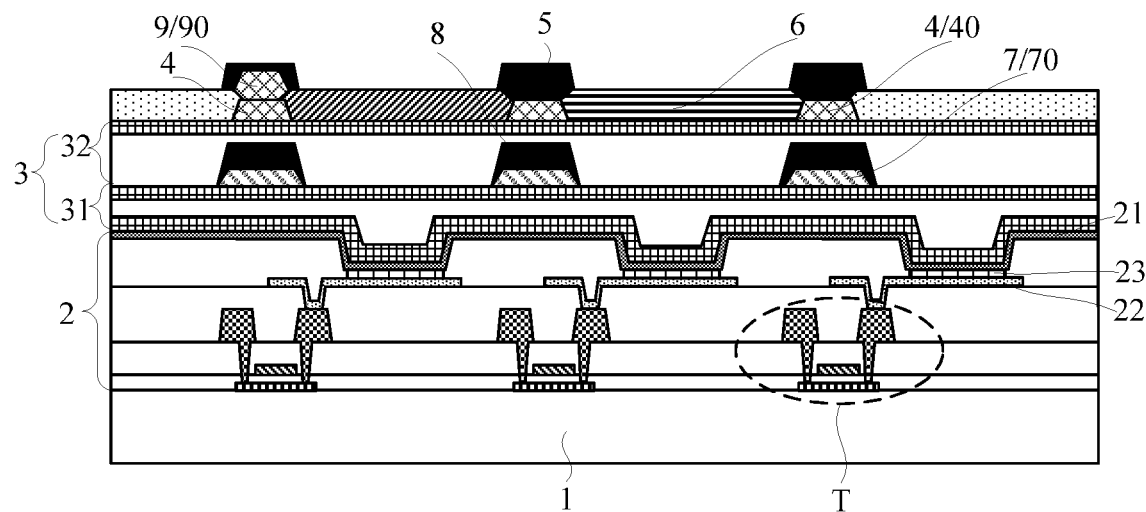
FIG. 11 is a schematic section view of a touch display panel according to another embodiment of the present disclosure.

In other embodiments, as shown in FIG. 11, which is a schematic section view of a touch display panel according to another embodiment of the present disclosure, the second electrode layer 9 is arranged between the first electrode layer and the color resistor layer, that is, the second electrode layer 9 is arranged between the first touch electrode 4 and the first black matrix 5. In an embodiment, the insulating layer between the second electrode layer 9 and the first electrode layer is the color resistor 6, to save materials and process steps. As shown in FIG. 11, two adjacent color resistors 6 form an area exposing the first touch electrode 4. Based on this, the second electrode layer 9 is arranged on a surface of the color resistor 6, so that the second electrode layer 9 can be electrically connected with the first touch electrode 4 through the area exposing the first touch electrode 4.

Figure 12:
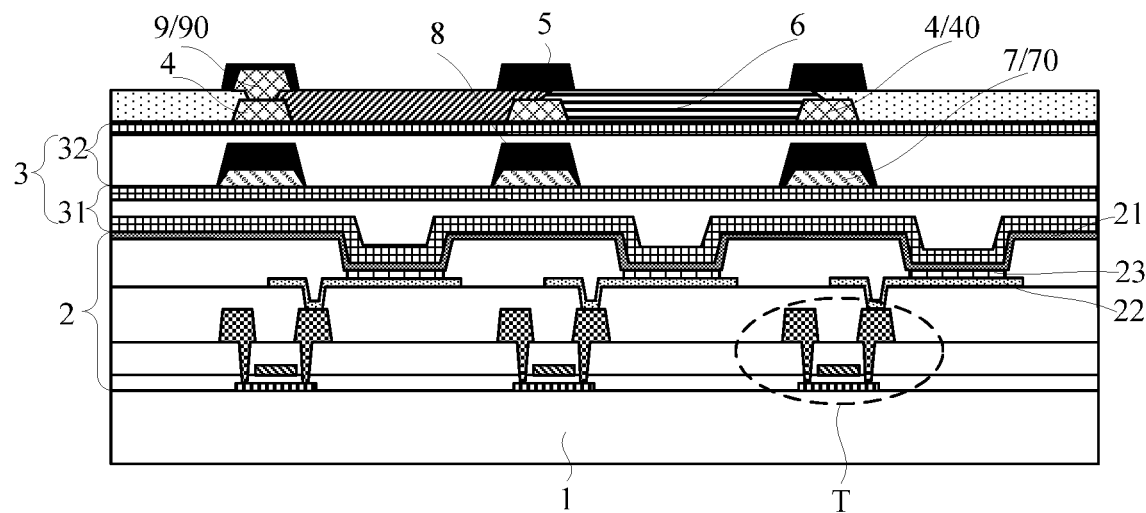
FIG. 12 is a schematic section view of a touch display panel according to another embodiment of the present disclosure.

FIG. 12 is a schematic section view of a touch display panel according to another embodiment of the present disclosure. The second electrode layer 9 is arranged between the first touch electrode 4 and the color resistor 6. In an embodiment, the insulating layer between the second electrode layer 9 and the first electrode layer is the color resistor 6, to save materials and process steps. As shown in FIG. 12, two adjacent color resistors 6 cover the first touch electrode 4, the second electrode layer 9 is electrically connected with the first touch electrode 4 via a via-hole through the color resistor 6.

Figure 13:
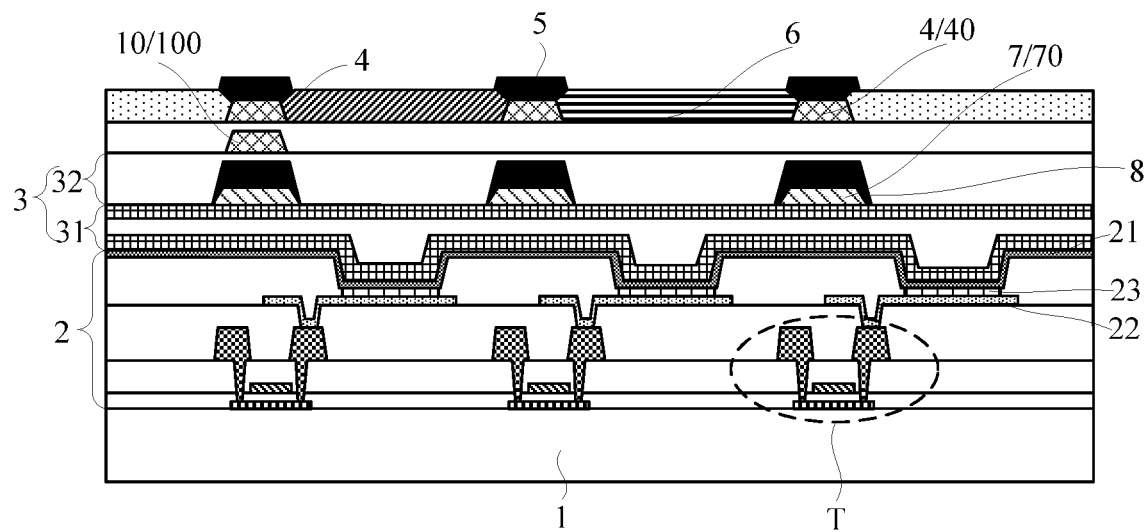
FIG. 13 is a schematic section view of a touch display panel according to another embodiment of the present disclosure.

FIG. 13 is a schematic section view of a touch display panel according to another embodiment of the present disclosure, in which the touch display panel further includes a third electrode layer 10. An insulating layer is arranged between the third electrode layer 10 and the first electrode layer.

As shown in FIG. 13, the third electrode layer 10 is arranged between the packaging layer 3 and the first electrode layer, that is, the third electrode layer 10 is arranged between the packaging layer 3 and the first touch electrode 4. In an embodiment, the insulating layer between the third electrode layer 10 and the first electrode layer is made of a same material as the packaging layer without an additional insulating material, to simplify process steps.

Figure 14:
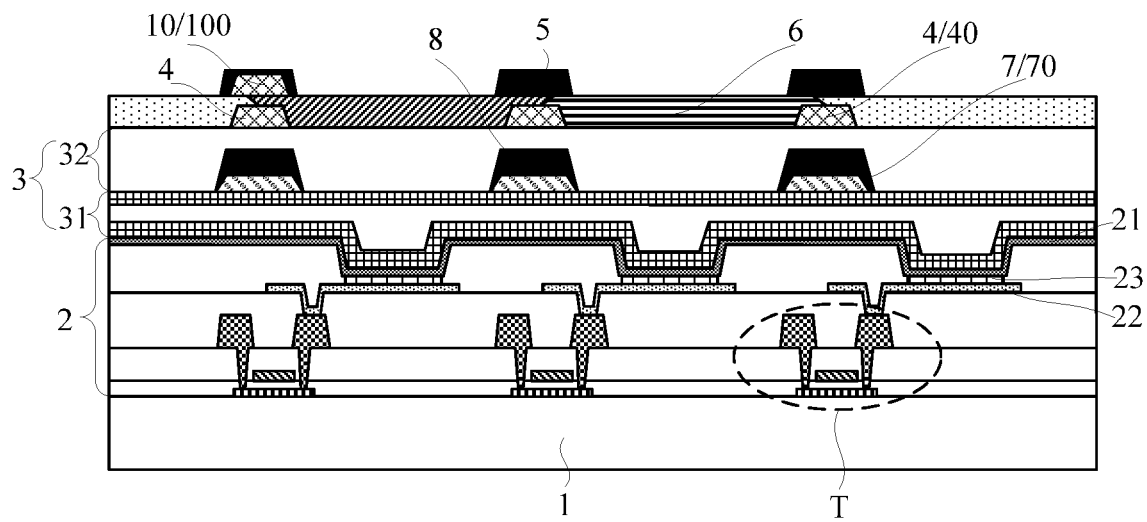
FIG. 14 is a schematic section view of a touch display panel according to another embodiment of the present disclosure.

FIG. 14 is a schematic section view of a touch display panel according to another embodiment of the present disclosure. The third electrode layer 10 is arranged between the first touch electrode 4 and the color resistor 6. In an embodiment, the insulating layer between the third electrode layer 10 and the first electrode layer is the color resistor 6, to save materials and process steps.

Figure 15:
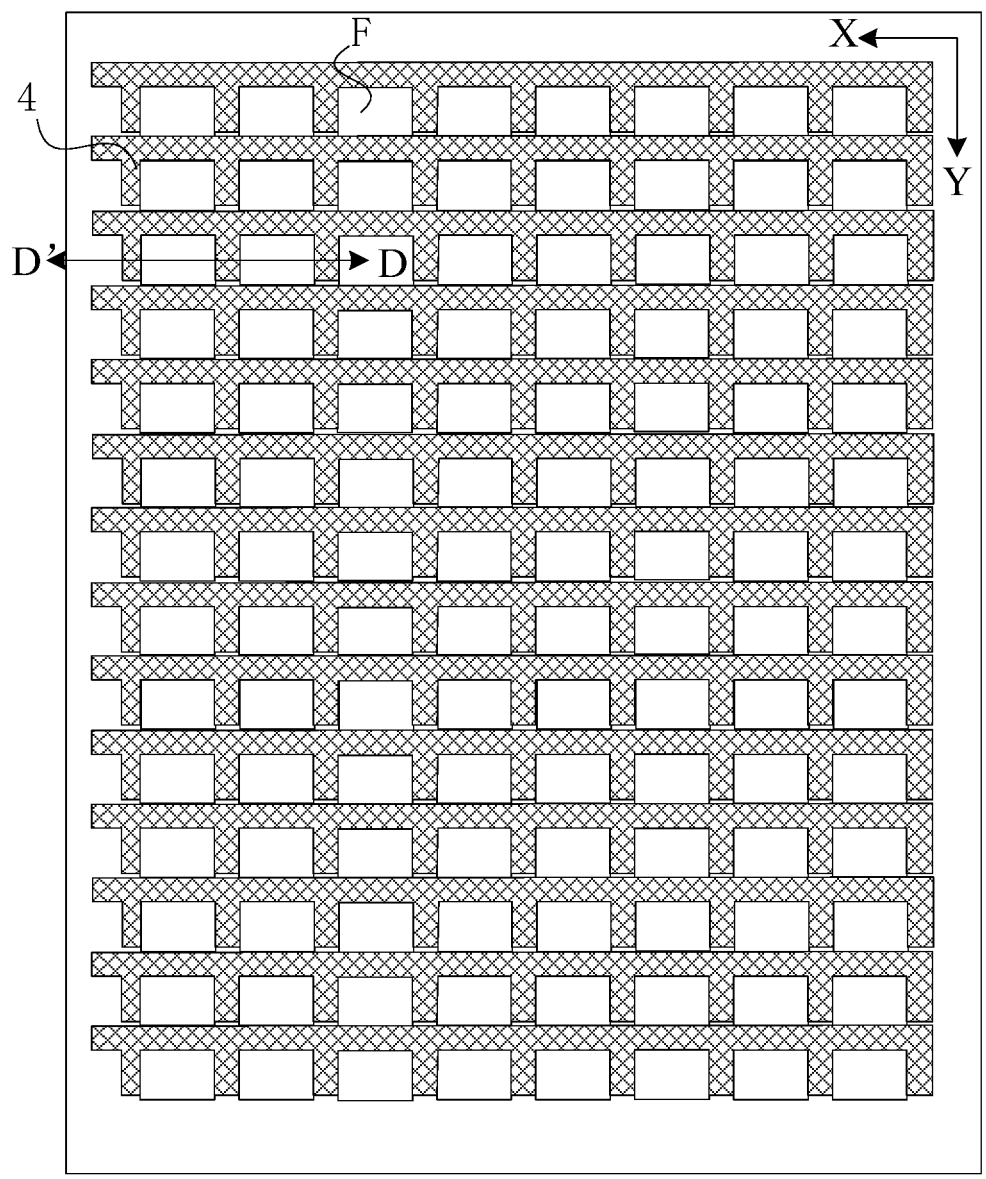
FIG. 15 is a schematic top view of multiple first touch electrodes according to an embodiment of the present disclosure.
Figure 16:
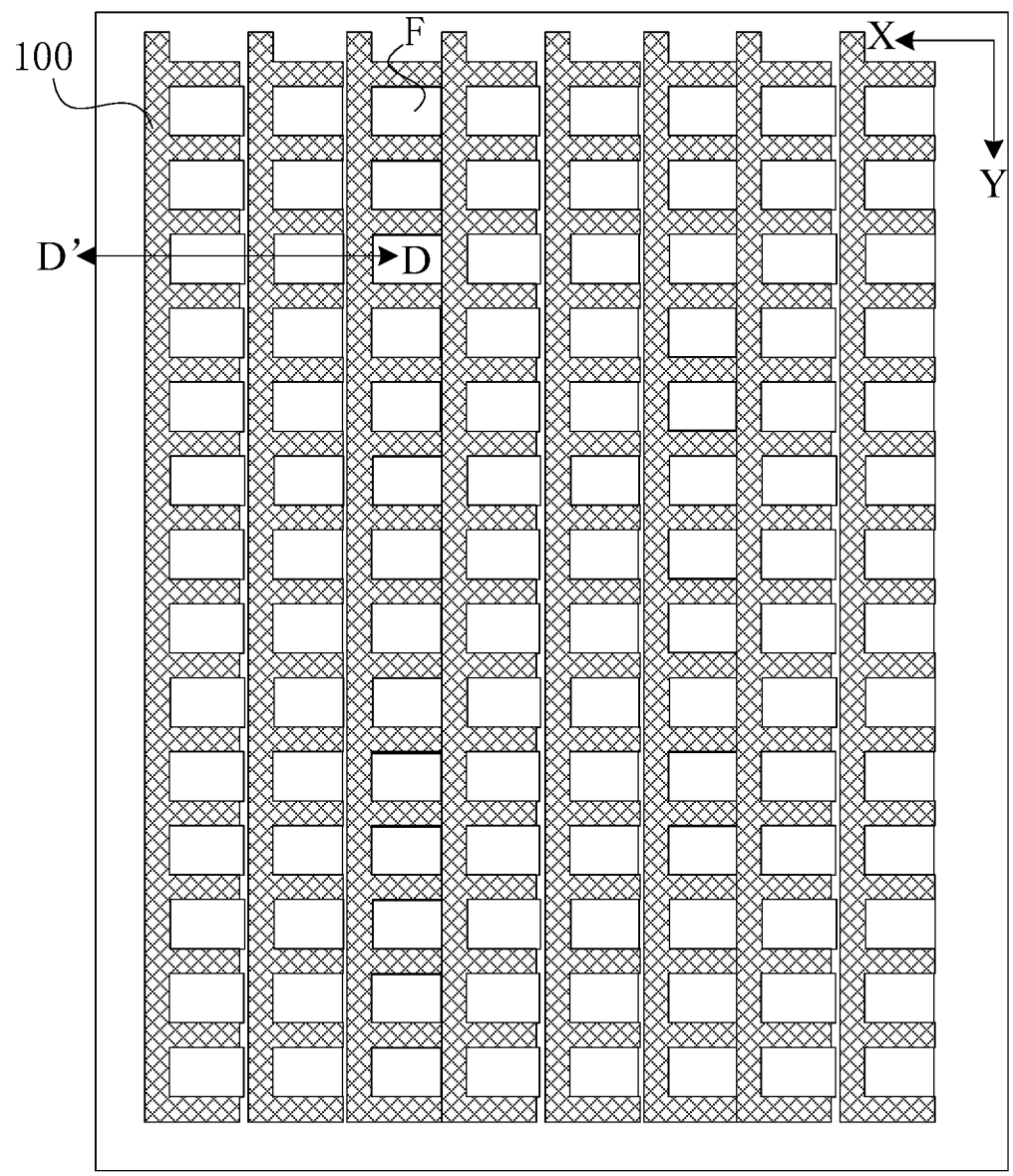
FIG. 16 is a schematic top view of multiple second touch electrodes according to an embodiment of the present disclosure.

Based on any one of the above embodiments, the third electrode layer 10 includes multiple second touch electrodes 100. As shown in FIG. 15, which is a schematic top view of multiple first touch electrodes 4 according to an embodiment of the present disclosure, the first touch electrode 4 extends along a first direction X, and the multiple first touch electrodes 4 are successively arranged in a second direction Y. As shown in FIG. 16, which is a schematic top view of multiple second touch electrodes 100 according to an embodiment of the present disclosure, the second touch electrode 100 extends along the second direction Y, and the multiple second touch electrodes 100 are successively arranged in the first direction X. The second direction Y intersects with the first direction X. Based on this, the first touch electrodes 4 and the second touch electrodes 100 perform the touch detection in a mutual capacitance way.

The embodiment of the present disclosure is illustrated only by taking the comb-teeth-shaped first touch electrode 4 and the comb-teeth-shaped second touch electrode 100 as an example, but the present disclosure is not so limited. In other embodiments, the first touch electrode 4 and the second touch electrode 100 may also be strip-shaped electrodes, and so on.

In a case that the mutual capacitance touch detection on the first touch electrode 4 and the second touch electrode 100 is performed, the first touch electrode 4 is arranged between the second touch electrode 100 and the auxiliary electrode 7, then parasitic capacitor affecting the touch capacitor between the first touch electrode 4 and the second touch electrode 100 is mainly generated between the first touch electrode 4 and the auxiliary electrode 7. If the second touch electrode 100 is arranged between the first touch electrode 4 and the auxiliary electrode 7, parasitic capacitor affecting the touch capacitor between the first touch electrode 4 and the second touch electrode 100 is mainly generated between the second touch electrode 100 and the auxiliary electrode 7.

In a charging stage of the first touch electrodes, the first touch electrode 4 is applied with the first driving signal, the auxiliary electrode 7 is applied with the second driving signal. Since the second driving signal and the first driving signal are synchronous, the parasitic capacitor is smaller, so that the influence of the parasitic capacitor on the touch capacitor between the first touch electrode 4 and the second touch electrode 100 can be effectively reduced, thereby improving sensitivity of the touch detection.

In other embodiments of the present disclosure, the touch display panel may not include the third electrode layer, but the auxiliary electrode 7 may include multiple second touch electrodes 100. As shown in FIG. 15, the first touch electrode 4 extends along a first direction X, and the multiple first touch electrodes 4 are successively arranged in a second direction Y. Referring to FIG. 16, the second touch electrode 100 extends along the second direction Y, and the multiple second touch electrodes 100 are successively arranged in the first direction X. The second direction Y is intersected with the first direction X.

In this case, the mutual capacitance touch detection on the first touch electrode 4 and the second touch electrode 100 is performed, and the touch capacitor between the first touch electrode 4 and the second touch electrode 100 is the parasitic capacitor between the first touch electrode 4 and the auxiliary electrode 7. In the charging stage of the first touch electrodes, the first touch electrode 4 is applied with the first driving signal, and the auxiliary electrode 7 is applied with the second driving signal. Since the second driving signal and the first driving signal are synchronous, the parasitic capacitor is smaller, that is, the touch capacitor between the first touch electrode 4 and the second touch electrode 100 is smaller. Therefore, when a finger touches the touch display panel, the capacitance value of the touch capacitor has a great disturbance, so that the capacitance value of the touch capacitor changes greatly, thereby improving sensitivity of the touch detection.

Figure 17:
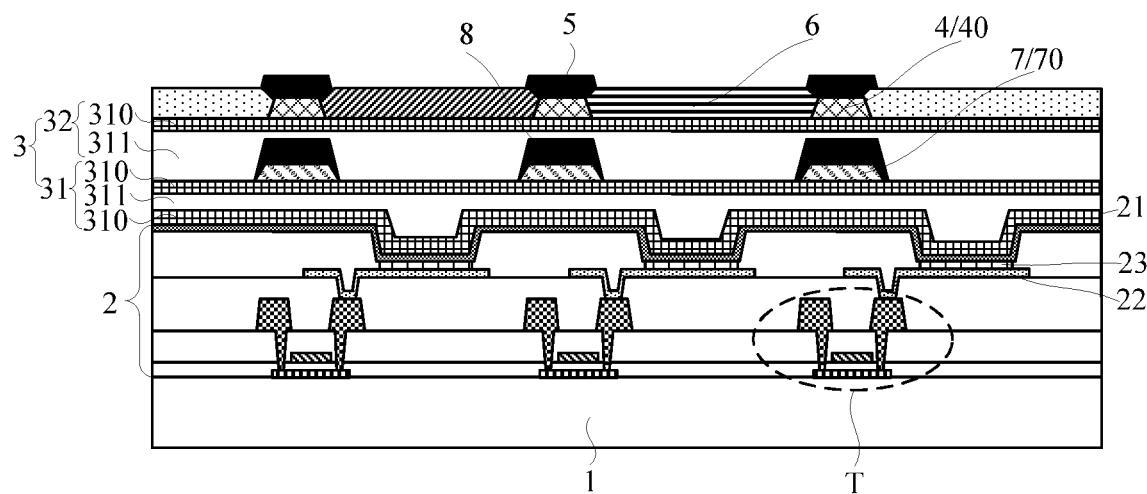
FIG. 17 is a schematic section view of a touch display panel according to another embodiment of the present disclosure.

In some embodiments of the present disclosure, as shown in FIG. 17, which is a schematic section view of a touch display panel according to another embodiment of the present disclosure, the first sub-packaging layer 31 and the second sub-packaging layer 32 each includes at least one inorganic insulating layer 310 and at least one organic insulating layer 311 that are laminated. Alternatively, the inorganic insulating layer 310 is a film layer evaporated by a chemical vapor deposition (CVD) process.

In some embodiments of the present disclosure, as shown in FIG. 17, the inorganic insulating layer 310 and the organic insulating layer 311 in the first sub-packaging layer 31 and the second sub-packaging layer 32 are alternately laminated, that is, the inorganic insulating layer 310 and the organic insulating layer 311 in the entire packaging layer 3 are alternately arranged to be laminated.

Moreover, in some embodiments of the present disclosure, the layer arranged on the side of the auxiliary electrode 7 facing toward the substrate 1 is the inorganic insulating layer 310, and the layer arranged on the side of the auxiliary electrode 7 away from the substrate 1 is the organic insulating layer 311. The present disclosure is not so limited. In other embodiments, the layer arranged on the side of the auxiliary electrode 7 facing toward the substrate 1 is the organic insulating layer 311, and the layer arranged on the side of the auxiliary electrode 7 away from the substrate 1 is the inorganic insulating layer 310.

Figure 18:
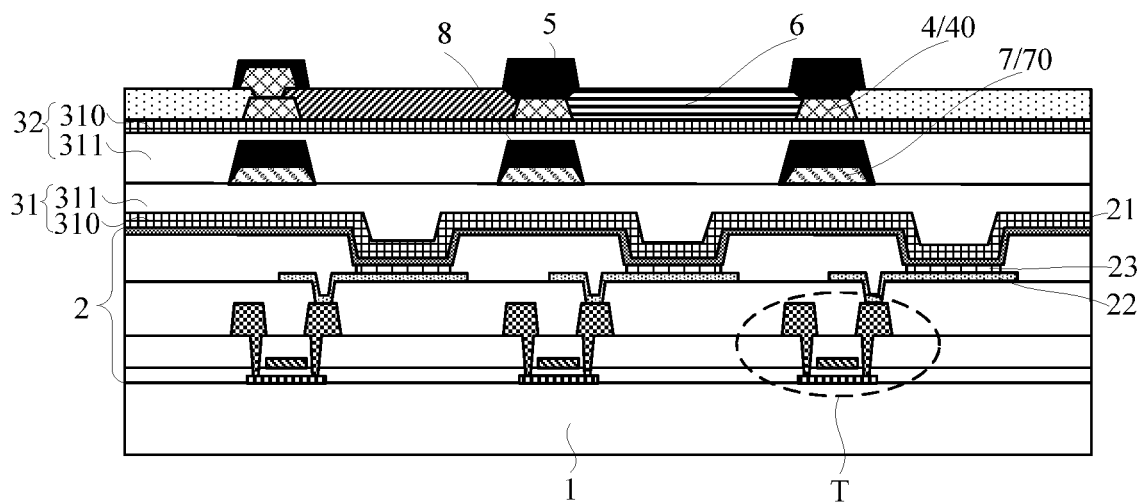
FIG. 18 is a schematic section view of a touch display panel according to another embodiment of the present disclosure.

In FIG. 18, which is a schematic section view of a touch display panel according to another embodiment of the present disclosure, the layers arranged on the side of the auxiliary electrode 7 facing toward the substrate 1 and the side of the auxiliary electrode 7 away from the substrate 1 are both the organic insulating layers 311.

By controlling the thickness of the first sub-packaging layer 31 in the display area, such as the thickness of the organic insulating layer 311 in the first sub-packaging layer 31, the distance between the auxiliary electrode 7 and the cathode 21 can be controlled, thereby providing an appropriate light emitting range to avoid crosstalk of light from different light-emitting units. Moreover, by controlling the thickness of the second sub-packaging layer 32 in the display area, such as the thickness of the organic insulating layer 311 in the second sub-packaging layer 32, the distance between the auxiliary electrode 7 and the first touch electrode 4 can be controlled, to control the parasitic capacitor between the auxiliary electrode 7 and the first touch electrode 4.

Figure 19:
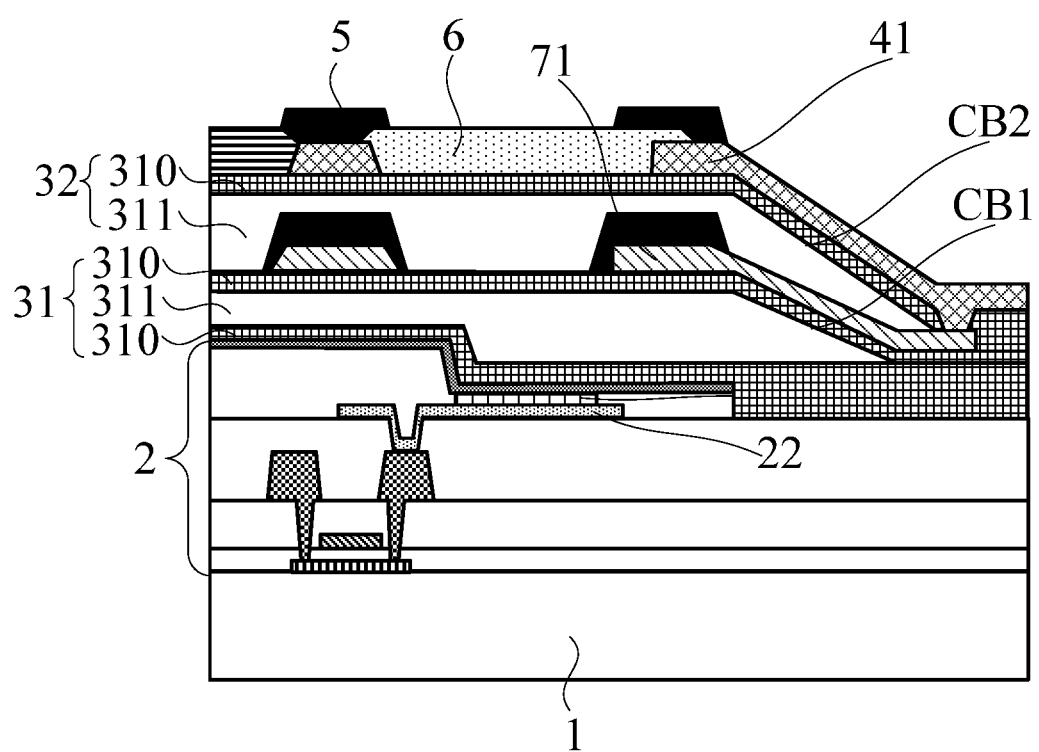
FIG. 19 is a schematic section view of a touch display panel according to another embodiment of the present disclosure.

In FIG. 19, which is a schematic section view of a touch display panel according to another embodiment of the present disclosure, the first sub-packaging layer 31 includes a first incline sidewall CB1 arranged in the non-display area of the touch display panel, and the second sub-packaging layer 32 includes a second incline sidewall CB2 arranged in the non-display area of the touch display panel. Alternatively, both the first incline sidewall CB1 and the second incline sidewall CB2 are arranged in the non-display area around the touch display panel.

In some embodiments of the present disclosure, the first incline sidewall CB1 and the second incline sidewall CB2 each includes the incline sidewall formed by the organic insulating layer 311. The first incline sidewall CB1 and the second incline sidewall CB2 respectively form an acute angle with a plane where the substrate 1 is located. In addition, a projection of the second incline sidewall CB2 covers a projection of the first incline sidewall CB1 in the direction perpendicular to the substrate 1, so that the first sub-packaging layer 31 and the substrate 1 form a structure wrapping film layers between the first sub-packaging layer 31 and the substrate 1, and the second sub-packaging layer 32 forms a structure wrapping the first sub-packaging layer 31 and film layers under the first sub-packaging layer 31, to avoid affecting structure and performance of the light-emitting device caused by water vapor outside the touch display panel entering into the light-emitting array layer 2.

In some embodiments of the present disclosure, as shown in FIG. 19, the auxiliary electrode 7 includes a first part 71, and the first touch electrode 4 includes a second part 41. The first part 71 and the second part 41 are located in the non-display area of the touch display panel. In the direction perpendicular to the substrate 1, projections of the first part 71 and the second part 41 are not overlapped with a projection of the light-emitting array layer 2. Alternatively, as shown in FIG. 18, the first part 71 is electrically connected with the second part 41. For example, the first part 71 is electrically connected with the second part 41 via a via-hole.

As shown in FIG. 19, the thickness of the packaging layer 3 is gradually reduced in a direction X1 from the display area to the non-display area by arranging the first incline sidewall CB1 and the second incline sidewall CB2, so that the thickness of the film layers between the first touch electrode 4 and the auxiliary electrode 7 is gradually reduced, so as to facilitate a formation of a via-hole electrically connecting the first touch electrode 4 and the auxiliary electrode 7. In addition, the via-hole does not affect packaging performance of the packaging layer 3, to prevent water vapor from entering the packaging layer 3 and the film layers wrapped by the packaging layer 3 via the via-hole.

Figure 20:
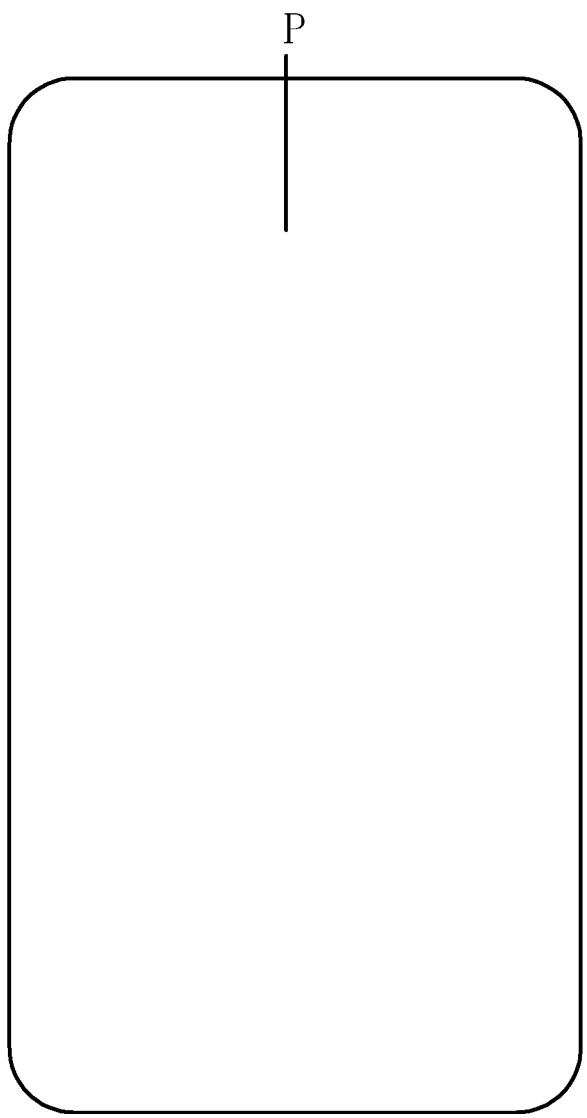
FIG. 20 is a schematic drawing of a touch display device according to an embodiment of the present disclosure.

A touch display device is further provided according to an embodiment of the present disclosure. The touch display device includes the touch display panel according to any one of the above embodiments. As shown in FIG. 20, which is a schematic drawing of a touch display device according to an embodiment of the present disclosure, the touch display device P includes but is not limited to a full screen mobile phone, a tablet computer, and a digital camera. Alternatively, the touch display device P is an OLED touch display device.

A method for driving a touch display panel is further provided according to an embodiment of the present disclosure. The method is applied to the touch display panel according to any one of the above embodiments. The method includes:

in a charging stage of a first touch electrode, a first driving signal is inputted to the first touch electrode, and a second driving signal is inputted to an auxiliary electrode, where the second driving signal and the first driving signal are synchronous.

A projection of the first touch electrode is at least partially overlapped with a projection of the auxiliary electrode in a direction perpendicular to a substrate. Therefore, parasitic capacitor affecting touch performance of the first touch electrode is mainly generated between the first touch electrode and the auxiliary electrode.

In the charging stage of the first touch electrodes, the first touch electrode is applied with the first driving signal, the auxiliary electrode is applied with the second driving signal, and the second driving signal and the first driving signal are synchronous. Therefore, the parasitic capacitor between the first touch electrode and the auxiliary electrode is smaller, so that the influence of the parasitic capacitor on the touch performance of the first touch electrode can be effectively reduced, thereby improving sensitivity of the touch detection.

The embodiments in the specification are described in a progressive way, and each embodiment lays emphasis on differences from other embodiments. For the same or similar parts between various embodiments, one may refer to the description of other embodiments. The device disclosed in the embodiment corresponds to the method disclosed in the embodiment, and is described relatively simply. For detailed description, reference may be made to the related description.

According to the above description of the disclosed embodiments, those skilled in the art can implement or practice the present disclosure. Many modifications to these embodiments are apparent for those skilled in the art, and general principles defined herein may be implemented in other embodiments without departing from the spirit or scope of the present disclosure. Hence, the present disclosure is not limited to the embodiments disclosed herein, but is to conform to the widest scope in accordance with the principles and novel features disclosed herein.

The invention claimed is:

1. A touch display panel, comprising:
a substrate; and
a light-emitting array layer, a packaging layer, a first electrode layer and a color resistor layer that are successively arranged on a surface of the substrate, wherein the first electrode layer comprises a plurality of first touch electrodes;
the packaging layer comprises at least a first sub-packaging layer and a second sub-packaging layer, the first sub-packaging layer and the second sub-packaging layer are successively arranged in a direction away from the substrate, an auxiliary electrode is arranged between the first sub-packaging layer and the second sub-packaging layer, and a projection of the first touch electrode is at least partially overlapped with a projection of the auxiliary electrode in a direction perpendicular to the substrate; and
the first touch electrode is applied with a first driving signal and the auxiliary electrode is applied with a second driving signal in a charging stage of the first touch electrodes, and the second driving signal and the first driving signal are synchronous,
wherein the auxiliary electrode is made of a conductive light-shielding material.

2. The touch display panel according to the claim 1, wherein the first driving signal and the second driving signal are synchronous signals with a same frequency, a same magnitude and a same phase.

3. The touch display panel according to the claim 1, wherein the first black matrix and the auxiliary electrode each has a mesh-shaped structure, and a line width of the auxiliary electrode is greater than the line width of the first black matrix.

4. The touch display panel according to the claim 1, wherein the plurality of first touch electrodes are arranged in an array, and the touch display panel further comprises a second electrode layer, wherein
the second electrode layer is arranged between the packaging layer and the first electrode layer; or the second electrode layer is arranged between the first electrode layer and the color resistor layer; and
an insulating layer is arranged between the second electrode layer and the first electrode layer, the second electrode layer comprises a plurality of touch wires, and the plurality of touch wires are electrically connected with the plurality of first touch electrodes, and
wherein the first black matrix is provided with a plurality of opening areas, and a plurality of color resistors are respectively arranged in the plurality of opening areas, and the insulating layer is the color resistors.

5. The touch display panel according to the claim 1, further comprising a third electrode layer, wherein
the third electrode layer is arranged between the packaging layer and the first electrode layer; or the third electrode layer is arranged between the first electrode layer and the color resistor layer;
an insulating layer is arranged between the third electrode layer and the first electrode layer; the third electrode layer comprises a plurality of second touch electrodes; the first touch electrode extends along a first direction, the plurality of first touch electrodes are successively arranged in a second direction, the second touch electrode extends along the second direction, the plurality of second touch electrodes are successively arranged in the first direction, and the second direction is intersected with the first direction, and
wherein the first black matrix is provided with a plurality of opening areas, and a plurality of color resistors are respectively arranged in the plurality of opening areas, and the insulating layer is the color resistors.

6. The touch display panel according to the claim 1, wherein the auxiliary electrode comprises a plurality of second touch electrode, wherein
the first touch electrode extends along a first direction, the plurality of first touch electrodes are successively arranged in a second direction, the second touch electrode extends along the second direction, the plurality of second touch electrodes are successively arranged in the first direction, and the second direction is intersected with the first direction.

7. The touch display panel according to the claim 1, wherein the first sub-packaging layer and the second sub-packaging layer each comprises at least one inorganic insulating layer and at least one organic insulating layer that are laminated.

8. The touch display panel according to the claim 7, wherein the inorganic insulating layer and the organic insulating layer in the first sub-packaging layer and the second sub-packaging layer are laminated in an alternative way.

9. The touch display panel according to the claim 8, wherein
a layer arranged on a side of the auxiliary electrode facing toward the substrate is the inorganic insulating layer; and a layer arranged on a side of the auxiliary electrode away from the substrate is the organic insulating layer.

10. The touch display panel according to the claim 7, wherein layers arranged on a side of the auxiliary electrode facing toward the substrate and a side of the auxiliary electrode away from the substrate are both the organic insulating layers.

11. The touch display panel according to the claim 1, wherein the color resistor layer comprises a plurality of color resistors, and two adjacent color resistors have an overlapping part therebetween, wherein the overlapping part completely covers the first touch electrode.

12. The touch display panel according to the claim 1, wherein the first sub-packaging layer comprises a first incline sidewall in a non-display area of the touch display panel, and the second sub-packaging layer comprises a second incline sidewall in a non-display area of the touch display panel, wherein
the first incline sidewall and the second incline sidewall respectively form an acute angle with a plane where the substrate is located, and a projection of the second incline sidewall covers a projection of the first incline sidewall in the direction perpendicular to the substrate.

13. The touch display panel according to the claim 12, wherein the auxiliary electrode comprises a first part and the first touch electrode comprises a second part, the first part and the second part are located in a non-display area of the touch display panel, projections of the first part and the second part are not overlapped with a projection of the light-emitting array layer in the direction perpendicular to the substrate, and the first part is electrically connected with the second part, and
wherein the first part and the second part are at least partially located on the incline sidewall of the first sub-packaging layer and the incline sidewall of second sub-packaging layer.

14. The touch display panel according to the claim 1, wherein the auxiliary electrode comprises a first part and the first touch electrode comprises a second part, wherein
the first part and the second part are located in a non-display area of the touch display panel, projections of the first part and the second part are not overlapped with a projection of the light-emitting array layer in the direction perpendicular to the substrate, and the first part is electrically connected with the second part.

15. A touch display device, comprising a touch display panel, the touch display panel comprising:
a substrate; and
a light-emitting array layer, a packaging layer, a first electrode layer and a color resistor layer that are successively arranged on a surface of the substrate, wherein
the first electrode layer comprises a plurality of first touch electrodes;
the packaging layer comprises at least a first sub-packaging layer and a second sub-packaging layer, the first sub-packaging layer and the second sub-packaging layer are successively arranged in a direction away from the substrate, an auxiliary electrode is arranged between the first sub-packaging layer and the second sub-packaging layer, and a projection of the first touch electrode is at least partially overlapped with a projection of the auxiliary electrode in a direction perpendicular to the substrate; and
the first touch electrode is applied with a first driving signal and the auxiliary electrode is applied with a second driving signal in a charging stage of the first touch electrodes, and the second driving signal and the first driving signal are synchronous,
wherein the auxiliary electrode is made of a conductive light-shielding material.

16. A method for driving a touch display panel, the touch display panel comprising:
a substrate; and a light-emitting array layer, a packaging layer, a first electrode layer and a color resistor layer that are successively arranged on a surface of the substrate, wherein the first electrode layer comprises a plurality of first touch electrodes; the packaging layer comprises at least a first sub-packaging layer and a second sub-packaging layer, the first sub-packaging layer and the second sub-packaging layer are successively arranged in a direction away from the substrate, an auxiliary electrode is arranged between the first sub-packaging layer and the second sub-packaging layer, and a projection of the first touch electrode is at least partially overlapped with a projection of the auxiliary electrode in a direction perpendicular to the substrate,
wherein the auxiliary electrode is made of a conductive light-shielding material;
the method comprising:
applying a first driving signal to the first touch electrode and applying a second driving signal to the auxiliary electrode in a charging stage of the first touch electrodes, wherein the second driving signal and the first driving signal are synchronous.

17. A touch display panel, comprising:
a substrate; and
a light-emitting array layer, a packaging layer, a first electrode layer and a color resistor layer that are successively arranged on a surface of the substrate, wherein
the first electrode layer comprises a plurality of first touch electrodes;
the packaging layer comprises at least a first sub-packaging layer and a second sub-packaging layer, the first sub-packaging layer and the second sub-packaging layer are successively arranged in a direction away from the substrate, an auxiliary electrode is arranged between the first sub-packaging layer and the second sub-packaging layer, and a projection of the first touch electrode is at least partially overlapped with a projection of the auxiliary electrode in a direction perpendicular to the substrate; and the first touch electrode is applied with a first driving signal and the auxiliary electrode is applied with a second driving signal in a charging stage of the first touch electrodes, and the second driving signal and the first driving signal are synchronous, wherein the color resistor layer comprises a first black matrix, and a projection of the first black matrix covers the projection of the first touch electrode and the projection of the auxiliary electrode in the direction perpendicular to the substrate.

18. The touch display panel according to the claim 17, further comprising a second black matrix, wherein the second black matrix is arranged between the auxiliary electrode and the second sub-packaging layer, and a projection of the second black matrix covers the projection of the auxiliary electrode in the direction perpendicular to the substrate.

19. The touch display panel according to the claim 18, wherein the first black matrix and the second black matrix each has a mesh-shaped structure;

a projection of the second black matrix covers the projection of the first black matrix in the direction perpendicular to the substrate; and a line width of the second black matrix is greater than a line width of the first black matrix.

* * * * *